(12) United States Patent
Kamatani et al.

(10) Patent No.: US 8,872,453 B2
(45) Date of Patent: Oct. 28, 2014

(54) MOTOR DRIVE CONTROLLER AND CONTROL METHOD

(71) Applicants: Tomohiko Kamatani, Hyogo (JP); Haruyuki Suzuki, Kanagawa (JP); Fumihiro Shimizu, Kanagawa (JP); Katsuhisa Furuse, Hyogo (JP)

(72) Inventors: Tomohiko Kamatani, Hyogo (JP); Haruyuki Suzuki, Kanagawa (JP); Fumihiro Shimizu, Kanagawa (JP); Katsuhisa Furuse, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 171 days.

(21) Appl. No.: 13/658,109

(22) Filed: Oct. 23, 2012

(65) Prior Publication Data
US 2013/0106326 A1 May 2, 2013

(30) Foreign Application Priority Data
Oct. 28, 2011 (JP) ................................. 2011-237171

(51) Int. Cl.
*H02P 6/16* (2006.01)

(52) U.S. Cl.
CPC ...................................... *H02P 6/16* (2013.01)
USPC ............ 318/400.06; 318/400.04; 318/400.01; 318/700

(58) Field of Classification Search
CPC ........................................................ H02P 6/16
USPC ................... 318/400.06, 400.04, 400.01, 700
See application file for complete search history.

(56) References Cited

U.S. PATENT DOCUMENTS

| 5,493,187 A * | 2/1996 | Iijima ...................... 318/400.14 |
| 2005/0001570 A1 | 1/2005 | Lee et al. |
| 2010/0219781 A1 | 9/2010 | Kuwamura |

FOREIGN PATENT DOCUMENTS

| JP | 2001-37279 | 2/2001 |
| JP | 2006-42476 | 2/2006 |
| JP | 2007-132742 | 5/2007 |
| JP | 2011-41417 | 2/2011 |
| KR | 10-2005-0003717 | 1/2005 |
| KR | 10-2010-0071052 | 6/2010 |

OTHER PUBLICATIONS

Korean official action dated Apr. 30, 2014 in corresponding. Korean patent application No. 10-2012-0120014.

* cited by examiner

*Primary Examiner* — David Luo
(74) *Attorney, Agent, or Firm* — Cooper & Dunham LLP

(57) ABSTRACT

A motor drive controller to control a motor via multiple sensors includes a first phase detector to compare respective differential pairs of the sensor signals from the same sensor to detect phases of the rotor, and output a first phase information signal; a second phase detector to compare a respective one of the multiple sensor signals with another sensor signal from the different sensor to detect the phases and output a second phase information signal; a phase divider to divide the phases, detected by the first and second phase detectors, into multiple predetermined phase intervals; a signal selector to select one of the multiple sensor signals in the multiple predetermined phase intervals; and a third phase detector to detect whether the signal selected by the signal selector reaches a predetermined threshold level corresponding to a predetermined phase of the rotor, and output a third phase information signal.

20 Claims, 15 Drawing Sheets

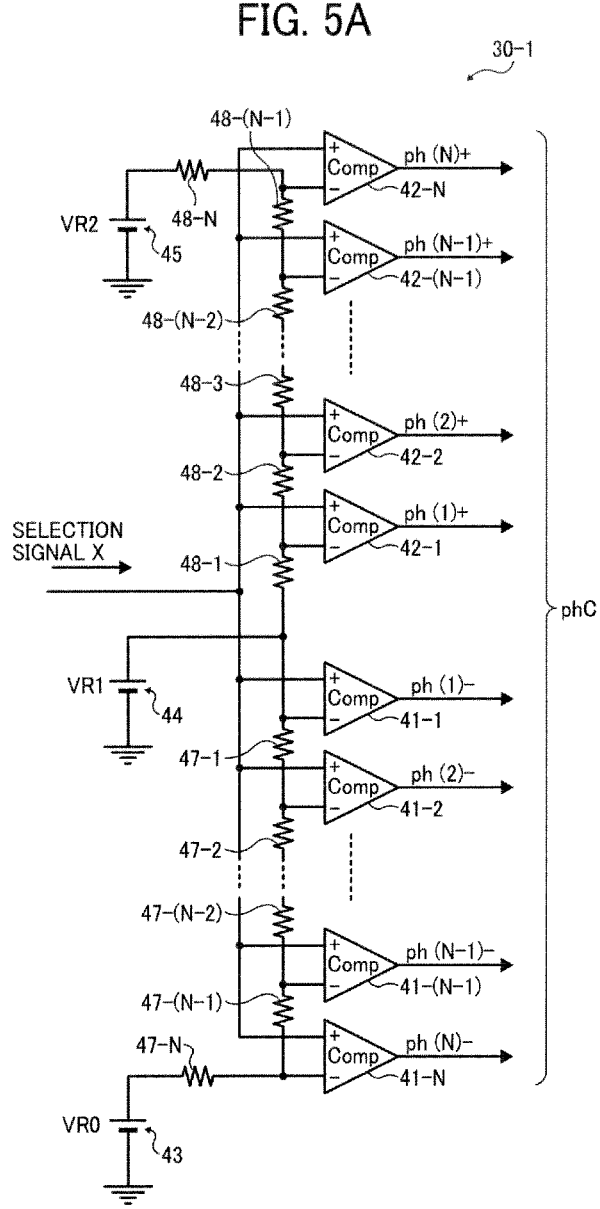

MOTOR DRIVE CONTROLLER AND CONTROL METHOD

CROSS-REFERENCE TO RELATED APPLICATION

This patent application is based on and claims priority pursuant to 35 U.S.C. §119 to Japanese Patent Application No. 2011-237171, filed on Oct. 28, 2011 in the Japan Patent Office, the entire disclosure of which is hereby incorporated by reference herein.

FIELD

1. Technical Field

The present disclosure relates to a motor drive controller including a phase detector to detect a phase of a rotor of a motor, and more particularly, to a motor drive controller employing a control method that drives the motor using the readings from a phase detector.

2. Description of the Related Art

When a rotary position of a motor is controlled, it is necessary to detect a rotational angle of the rotor. In general, relative rotational angle of the rotor is detected by connecting a rotary shaft of the motor to a rotary encoder, outputting a two-phase pulse signal having a phase difference of a quarter cycle that changes with the rotational angle, and detecting edges and high/low state of the two-phase pulse signal.

The optical encoder typically includes a disk in which slits (serving as optical windows) are formed equidistantly around the periphery of the disk, and two photo-interrupters arranged at a quarter interval of the slit pitch of the disk. By binarizing two output signals from the two photo-interrupters, the two-phase pulse signal can be acquired.

In addition, in JP-3500328-B (JP-2001-037279-A), a motor drive controller obtains most of the phase information (position information) of the motor without using the optical encoder, and drives the motor. More specifically, an inverter of the motor drive controller outputs a hole-sensor edge whenever a rotation change happens that corresponds to an electrical angle of 60° of the rotor of the brushless motor, measures times of the edge intervals of the hole-sensor, and generates a cycle pulse signal having $\frac{1}{32}$ of the measured edge interval time. That is, the inverter obtains phase information that divides 60° into 32 equal parts.

However, in this example of the motor drive controller, when a rotational velocity of the rotor changes in the hole-sensor edges, some error between an estimated rotary position change of the rotor and an actual rotary change may appear, and accurate phase information cannot be obtained.

Further, in JP-2011-041417-A, a motor drive controller obtains most of the phase information (position information) of the motor and drives the motor without using an absolute-type rotary encoder. More specifically, using a hole-sensor signal at electrical angle intervals of 60° and a function-generator or frequency-generator (FG) signal to generate a pulse signal having an angle fluctuation smaller than that of the hole-sensor signal, or detecting and processing count by optical encoder, the motor drive controller acquires more detailed phase information with which to drive the motor.

However, in this example, although the motor drive controller can to some extent cope with rotary velocity change at the hole sensor edge interval due to use of an FG signal having smaller intervals than the hole sensor edge interval, doing so requires counting processors for counting the sensor signal and the FG signal, a FG signal generator or increment-type optical encoder, and a FG signal amplifier, all of which may increase the device size and cost of manufacture.

In addition, in a rotation angle detection device proposed in JP-2007-132742-A, in a configuration in which eight magnetic sensors (transducers) are disposed at electrical angles of 45° having a highly linear angular range, the respective signals are read out in order, and the rotational angle (phase) is detected using these signals from eight sensors.

However, in this example, eight sensors are required, which for the small motor increases the installation space of the sensors and the cost.

SUMMARY

In one aspect of this disclosure, there is provided a motor drive controller to drive and control a motor that has a rotor and multi-phase coils inside the rotor, based on multiple rotational angle detectors that generate multiple differential sensor signals corresponding to different positions of the rotor. The motor drive controller includes a signal amplifier-converter circuit, a first phase detector, a second phase detector, a phase divider, a signal selector, and a third phase detector. The signal amplifier-converter circuit amplifies and converts the differential sensor signals into single-ended sensor signals. The first phase detector compares the multiple single-ended sensor signals with multiple predetermined threshold levels to detect phases of the rotor, and outputs a first phase information signal representing a first detected phase. The second phase detector compares a respective one of the multiple single-ended sensor signals with another of the single-ended sensor signals from the different rotational detector via the signal amplifier-converter circuit to detect the phases of the rotor and outputs a second phase information signal representing a second detected phase. The phase divider divides the phases, detected by the second phase detector, into multiple predetermined phase intervals. The signal selector selects one of the respective multiple ingle-ended sensor signals from the signal amplifier-converter circuit in the multiple predetermined phase interval. The third phase detector detects whether the signal selected by the signal selector reaches a predetermined threshold level corresponding to a predetermined phase of the rotor, and outputs a third phase information signal representing a third detected phase different from the first detected phase and the second detected phase.

In another aspect of this disclosure, there is provided another motor drive controller to drive and control a motor that has a rotor and multi-phase coils inside the rotor, based on multiple rotational angle detectors to generate multiple differential sensor signals corresponding to different positions of the rotor. The motor drive controller includes a first phase detector, a second phase detector, a phase divider, a signal selector, and a third phase detector. The first phase detector compares a respective one of the multiple sensor signals with a paired sensor signal from the same rotational angle detector to detect phases of the rotor, and outputs a first phase information signal representing first detected phase. The second phase detector compares a respective one of the sensor signals with another sensor signal from the different rotational angle detector to detect the phases and outputs a second phase information signal representing a second detected phase. The phase divider divides the phases, detected by the first phase detector and the second phase detector, into multiple predetermined phase intervals. The signal selector to select one of the respective multiple sensor signals from the rotational angle detectors, in the multiple predetermined phase interval. The third phase detector detects whether the signal selected by the signal selector reaches a predetermined threshold level corresponding to a predetermined phase of the rotor, and outputs a third phase information signal representing a third detected phase different from the first detected phase and the second detected phase.

In another aspect of this disclosure, there is provided a control method of driving and controlling a motor that has a rotor and multi-phase coils inside the rotor, based on multiple differential sensor signals, generated by rotational angle detectors, corresponding to different positions of the rotor. The method including the steps of: comparing a respective one of the multiple sensor signals with a paired sensor signals from the same rotational angle detector to detect phases of the rotor; outputting a first phase information signal representing a first detected phase; comparing a respective one of the sensor signals with another of the sensor signals from the different rotational angle detector to detect the phases; outputting a second phase information signal representing a second detected phase; dividing the first detected phase and the second detected phase into multiple predetermined phase intervals; selecting one of the respective multiple sensor signals from the rotational angle detectors, in the multiple predetermined phase interval; and detecting whether the selected signal reaches a predetermined threshold level corresponding to a predetermined phase of the rotor; and outputting a third phase information signal representing a third detected phase different from the first detected phase and the second detected phase.

BRIEF DESCRIPTION OF THE DRAWINGS

The aforementioned and other aspects, features, and advantages will be better understood by reference to the following detailed description when considered in connection with the accompanying drawings, wherein:

FIG. 5A is a circuit diagram illustrating a first configuration of a third phase-information detection circuit shown in FIGS. 3A and 3B according to the second embodiment;

DETAILED DESCRIPTION OF PREFERRED EMBODIMENTS

Figure 1:
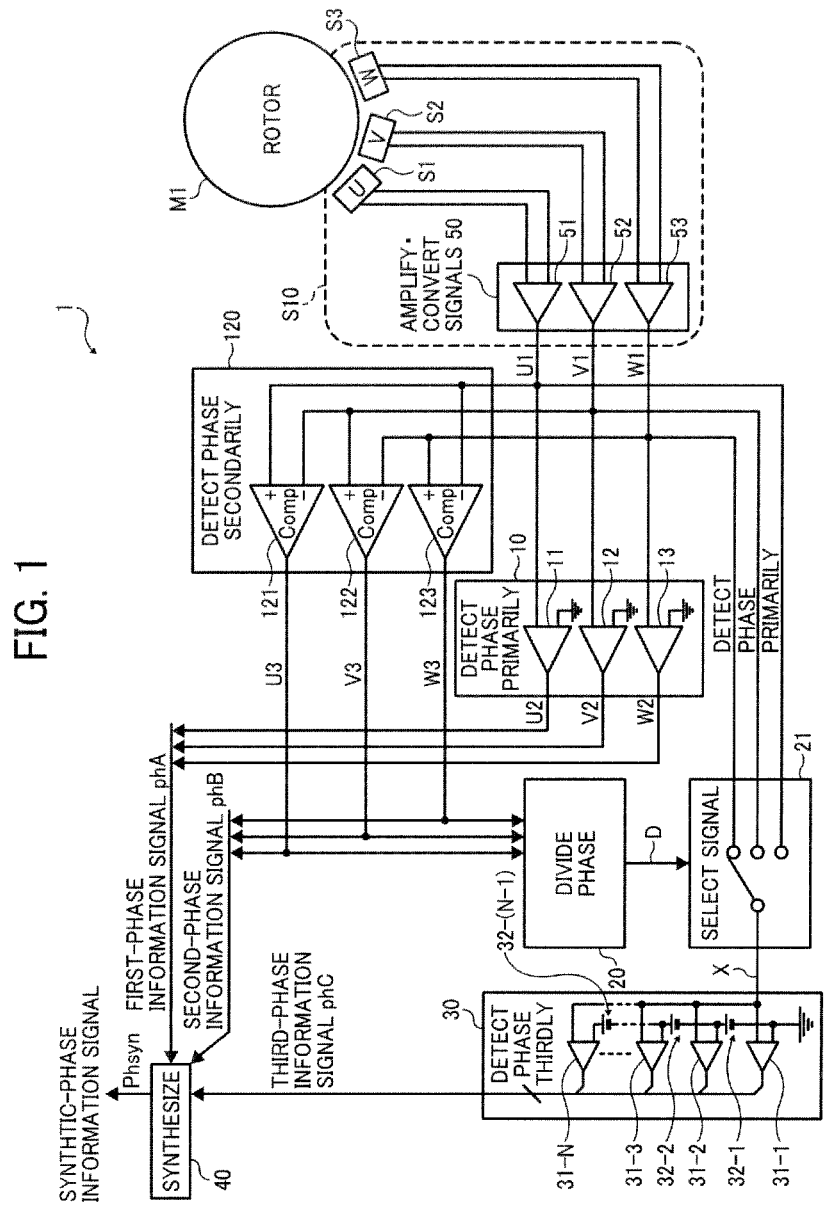
FIG. 1 is a block diagram illustrating a configuration of a motor drive controller according to a first embodiment of the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, particularly to FIGS. 1 through 13, motor drive controllers according to illustrative embodiments are described.

(First Embodiment)

FIG. 1 is a block diagram illustrating a configuration of a motor drive controller 1 according to a first embodiment of the present disclosure.

In FIG. 1, a sensor integrated circuit (IC) S10 is provided around a rotor of a motor M1, and a motor driver controller 1 is connected to the motor M1 via the sensor IC S10. In the sensor IC, magnetic sensors (S1, S2, and S3) output differential sensor signals (U1, U1−; V1, V1−; and W1, −W1) and a signal amplifier-converter circuit 50 amplifies and converts the differential sensor signals (U1, U1−; V1, V1−; and W1, W1−) into amplified single-ended sensor signals (U1, V1, and W1). The motor driver controller 1 detects phase information of the motor M1 based on the amplified single-ended sensor signals (U1, V1, and W1) from the signal amplifier-converter circuit 50. The motor drive controller 1 includes a first phase-information detection circuit 10, a second phase-information detection circuit 120, a phase dividing circuit 20, a signal selection circuit 21, a third phase-information detection circuit 30, and a synthesis circuit 40.

In FIG. 1, the respective differential sensor signals (U1, U1−; V1, V1−; and W1, W1−) from the rotational angle detectors (sensors) S1, S2, and S3 (U-phase, V-phase, and W-phase) are amplified and converted into the single-ended signals (U1, V1, and W1) by the signal amplifier-converter circuit 50 that has three amplifiers 51, 52, and 53. Then, the single-ended sensor signals (U1, V1, and W1) are input to the first phase-information detection circuit 10, the second phase-information detection circuit 120, and the signal selection circuit 21.

TABLE 1 shows levels of comparison result signals U2, V2, and W2 corresponding to comparison of the input signals (U1, V1, and W1) input to the first phase-information detection circuit 10 shown in FIG. 1, relative to multiple threshold values (reference level Ref).

TABLE 1

| PHASE INFORMATION COMPARISON SIGNAL | HIGH | LOW |
|---|---|---|
| U2 | U1 ≥ Ref | U1 < Ref |
| V2 | V1 ≥ Ref | V1 < Ref |
| W2 | W1 ≥ Ref | W1 < Ref |

The first phase-information detection circuit (first phase detector) 10 includes three comparators 11, 12, and 13. The comparators 11, 12, and 13 compare amplitudes (strengths) of the input amplified sensor signals (U1, V1, and W1) with the reference level Ref, and generate either high-level (Hi) comparison result signals (U2, V2, and W2) or low level (Low) comparison result signal (U2, V2, and W2) for output to the synthesis circuit 40 in accordance with comparison result shown in TABLE 1.

Herein, a first phase-information signal PhA, having a predetermined phase, is made based on the comparison result signals U2, V2, and W2 from the first phase-information detection circuit 10.

The second phase-information detection circuit (second phase detector) 120 includes three comparators 121, 122, and 123. The comparators 121, 122, and 123 generate comparison result signals U3, V3, and W3 for two values in accordance with comparison result shown in TABLE 2, for output to the phase dividing circuit 20 and the synthesis circuit 40.

Herein, a second phase-information signal phB, having a predetermined phase, is made based on the comparison result signals U3, V3, and W3 from the second phase-information detection circuit 120.

TABLE 2

| PHASE INFORMATION SIGNAL | HIGH | LOW |
| --- | --- | --- |
| U3 | U1 < V1 | U1 ≥ V1 |
| V3 | V1 ≥ W1 | V1 < W1 |
| W3 | W1 ≥ U1 | W1 < U1 |

In FIG. 1, the phase dividing circuit (phase divider) 20 receives the comparison result signals U3, V3, and W3 and generates a signal-selection signal D whose phase is divided into intervals having predetermined phase-intervals based on the comparison result signals U3, V3, and W3, for output to the signal selection circuit 21.

The signal selection circuit (signal selector) 21 receives the above-described amplified single-ended sensor signals (U1, V1, and W1). The signal selection circuit 21 selects a suitable one of the amplified sensor signals (U1, V1, and W1), based on the signal-selection signal D from the phase dividing circuit 20, for output to the third phase-information detection circuit 30 as a selection signal X.

The third phase-information detection circuit (third phase detector) 30 mainly includes multiple (N−1 number of) voltage sources 32-1 through 32-(N−1) and multiple (N number of) phase detectors 31-1 through 31-N. The third phase-information detection circuit 30 compares the selection signal X with multiple threshold levels generated by the multiple (N−1 number of) voltage sources 32-1 through 32-(N−1) to generate a third phase-information signal phC indicating that the motor M1 is rotated at a predetermined angle, for output to the synthesis circuit 40.

That is, each of the predetermined threshold level indicates the level corresponding to amplitude of the sensor signals (U1, V1, and W1) from the rotational angle detector S1, S2, and S3 (threshold level corresponding to a predetermined phase of the rotor), which are set in advance.

Then, the synthesis circuit (synthesizer) 40 synthesizes the first phase-information signal PhA, the second phase-information signal PhB, and the third phase-information signal phC to generate a synchronized phase information signal Phsyn.

Figure 2:
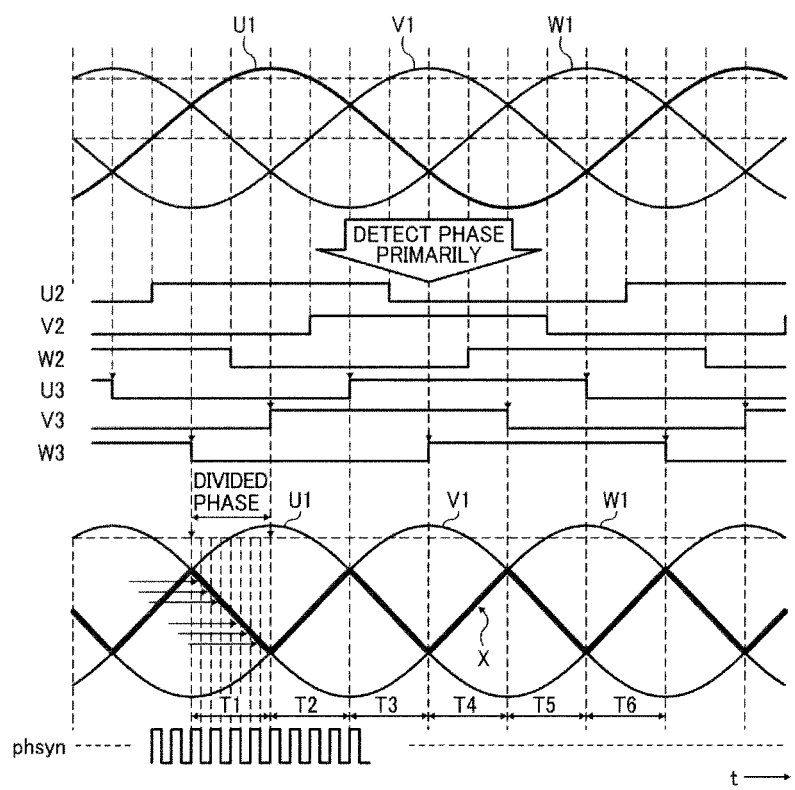
FIG. 2 is a timing chart illustrating operation of the respective signals of the motor drive controller.

FIG. 2 is a timing chart illustrating operation of the respective signals of the motor drive controller 1 shown in FIG. 1.

In FIG. 2, non-inverting signals U1, V1, and W1 of the differential sensor signals from the sensors S1, S2, and S3 are illustrated as sine waves or waveforms essentially similar to sine waves. Conversely, inverting signals −U1, V1−, and W1− of the differential sensor signals from the sensors S1, S2, and S3 have waveforms of opposite phase to the sine waveforms. The sensors S1, S2, and S3 are arranged at 120° intervals.

In FIG. 2, the first phase-information detection circuit 10 obtains the comparison result signal (U2, V2, and W2) as comparison results comparing the amplified single-ended sensor signal (U1, V1, and W1) with an amplitude center level (common level=reference level Ref), as illustrated in TABLE 1. In addition, as illustrated in TABLE 2, the second phase-information detection circuit 120 obtains the comparison result signal U3, V3, and W3 as comparison results of the strengths of the amplified sensor signals U1, V1, and W1.

The phase dividing circuit 20 receives the comparison result signals U3, V3, and W3 from the second phase-information detection circuit 120. The phase dividing circuit 20 divides the predetermined phase in intervals between switching edges among the comparison result signals U3, V3, and W3.

Then, the signal selection circuit 21 selectively switches the selection signal X in accordance with comparison result shown in TABLE 3. The selection signals X is represented by a heavy line in a bottom section in FIG. 2.

TABLE 3

| PERIOD | CONDITION OF INPUT SIGNALS | SELECTION SIGNAL X | SIGNAL PHASE (ANGLE) |
| --- | --- | --- | --- |
| T1 | U3 = V3 = W3 = Low | W1 | 150-210 |
| T2 | U3 = W3 = Low & V3 = Hi | V1 | −30-30 |
| T3 | U3 = V3 = Hi & W3 = Low | U1 | 150-210 |
| T4 | U2 = V3 = W3 = Hi | W1 | −30-30 |
| T5 | U3 = W3 = Hi & V3 = Low | V1 | 150-210 |
| T6 | U3 = V3 = Low & W3 = Hi | U1 | −30-30 |

In FIG. 2, the selection signal X is assigned to 60° intervals within a range from −30° to 30° or −150° to 210° of the sine wave phase, having highly linearity. That is, each of the assigned (divided) phase intervals corresponds to the electrical angle of 60° of the rotor of the motor M1.

In addition, in FIG. 2, horizontal broken lines indicate the predetermined threshold values VR2 and VR1 generated from the voltage sources 32. When the selection signal X from the signal selection circuit 21 reaches the predetermined threshold values VR2 and VR1, indicated by the broken line shown in FIG. 2, the signal selection circuit 21 outputs pulse edges.

For example, when the range of the electrical angle from −30° to 30° is divided into 8 equal parts at intervals corresponding to the electrical angle of 7.5°, the relation between the amplitude width and the electrical angle is illustrated in TABLE 4.

TABLE 4 represents the relation between the electrical angles and the amplitude ratio of the selection signal X from the signal selection circuit 21 shown in FIG. 1.

TABLE 4

| ELECTRICAL ANGLE | AMPLITUDE RATIO |
| --- | --- |
| −30 | −0.500 |
| −22.5 | −0.383 |
| −15 | −0.259 |
| −7.5 | −0.131 |
| 0 | 0.000 |

TABLE 4-continued

| ELECTRICAL ANGLE | AMPLITUDE RATIO |
|---|---|
| 7.5 | 0.131 |
| 15 | 0.259 |
| 22.5 | 0.383 |
| 30 | 0.500 |

In TABLE 4, a common level of the single-ended sensor signal (U1, V1, and W1) is set to 0, and the amplitude of the electrical angle of 90° is set to 1. The signal selection circuit 21 determines the predetermined level of the ratios of the electrical angles relative to the amplitude of the sine wave of the selection signal X based on correspondence relation of TABLE 4.

Herein, the electrical angles of −30°, 0°, and 30° are not always necessary for the third phase-information detection circuit 30 because the electrical angles of −30°, 0°, and 30° can be used in the second phase information signal phB and the electrical angle of 0° can be used in the first phase information signal phA.

FIG. 5A is a circuit diagram illustrating a first configuration 30-1 of the third phase-information detection circuit 30 shown in FIGS. 3A and 3B (to be described later).

In FIG. 5A, the third phase-information detection circuit 30-1 includes three voltage sources 43, 44, and 45, and multiple (2N number of) resistors 47-N through 47-1, and 48-1 through 48-N connected in series respectively, multiple (2N number of) comparators 41-N through 41-1, and 42-1 through 42-N. The third phase-information detection circuit 30-1 compares the signal amplitude of the selection signal X with the multiple threshold levels and generates and outputs phase detection signals (third phase detection signal) phC ("ph(N)-s" through "ph(1)-", and "ph(1)+" through "ph(N)+").

In FIG. 5A, a voltage level VR1 of the voltage source 44 is a center level (common level) of amplitude of the sine wave, a voltage level VR2 of the voltage source 45 corresponds to an upper limit of the amplitude of the sine wave, and a voltage level VR0 of the voltage source 43 is a lower limit of the amplitude of the sine wave. The level divided at amplitude ratio interval corresponding to the electrical angle around the voltage level VR1 is compared with the selection signal X. As the selection signal X is simply increased or simply decreased, the third phase detection signal phC is switched in order and is output.

The synthesis circuit 40 synthesizes the first phase-information detection signal phA from the first phase-information detection circuit 10, the second phase-information signal phB from the second phase-information detection circuit 120, and the third phase-information signal phC from the third phase-information detection circuit 20 to generate a synchronized phase-information signal phC to generate at least one digital signal having two-phase as a motor control signal.

As described above, in the present embodiment, using the third phase-detection signal phC that outputs whenever the selection signal X reaches a predetermined threshold value (e.g., VR2, VR0) of the amplitude corresponding to the electrical angles, a larger amount of the phase information exceeding that of the first phase-information signal phA can be acquired.

The above-illustrated TABLE 4 is just one example of the correspondence relation to acquire the phase information at the intervals corresponding to electrical angle of 7.5°.

As another setting, when the amplitude is divided into intervals corresponding to electrical angle of 6°, 1.25 times of phase information of TABLE 4 can be obtained (for the synthesis phase information signal Phsyn). As yet another settings, when the amplitude is divided into intervals corresponding to electrical angle of 3°, 2.5 times of phase information of TABLE 4 can be obtained.

In FIG. 2, the selection signal X is ranged from −30° to 30° or from 150° to 210° of the sensor signal, and therefore, the selection signal X can be a continuous signal when the phase interval is switched and the selected sensor signals are changed. In addition, the adjacent signals of the third phase information signal PhC of the comparison result signal from the third phase-information detection circuit 30 shown in FIG. 5A are switched in order, which enables the third phase-information detection circuit 30 to output a Gray-code output signal.

(Second Embodiment)

Figure 3A:
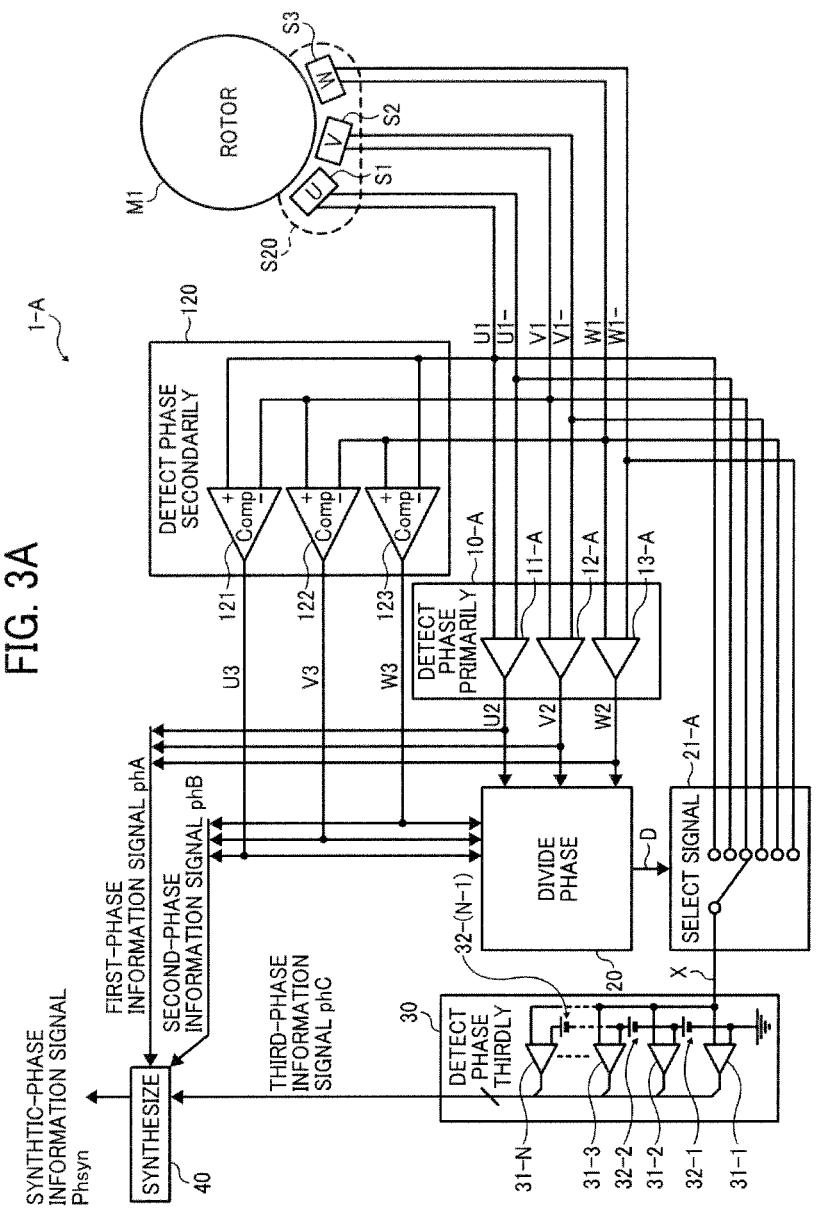
FIG. 3A is a block diagram illustrating a configuration of a motor drive controller according to a second embodiment.

FIG. 3A is a block diagram illustrating a configuration of a motor drive controller 1-A according to a second embodiment.

Compared with the motor driver controller 1 according to the first embodiment, the motor drive controller 1-A according to the second embodiment does not include the amplifier-converter circuit 50 to adjust and convert the amplitude of the differential sensor signals from the sensors S1, S2, and S3.

That is, a first phase-information detection circuit 10-A, a second phase-information detection circuit 120-A, and a signal selection circuit 21-A do not receive the single-ended signals (U1, V1, and W1) but directly receive the differential sensor signals (U1, U1−; V1, V1−; W1, W1−) from the sensors S1, S2, and S3 (U-phase, V-phase, and W-phase).

In the first phase-information detection circuit 10-A, the sensor signals U1 and U1− are input to a comparator 11-A, the sensor signals V and V1− are input to a comparator 12-A, and the sensor signals W1 and W1− are input to a comparator 13-A. The phases of the signals are detected respectively. That is, the first phase detection circuit 10-A compares a respective one of the multiple sensor signals (e.g., U1) with a paired sensor signal (−U1) from the same rotational angle detector (S1) to detect phases of the rotor. In other word, the first phase detection circuit 10-A compares respective differential pairs of the non-inverting sensor signals (U1, V1, W1) with the inverting sensor signal (U1−, V1−, W1−) from the same rotational angle detector (S1, S2, S3) to detect phases of the rotor. In the second phase-information detection circuit 120-A, because strengths of the respective sensor signals are compared respectively (a respective one of the sensor signals (e.g., U1) is compared with another of the sensor signals (V1 or W1) from the different sensors (S2, S3), it is not necessary to input all differential signals, but, only one-side of the differential sensor signals may input to the second phase-information detection circuit 120-A.

(Variation)

Figure 3B:
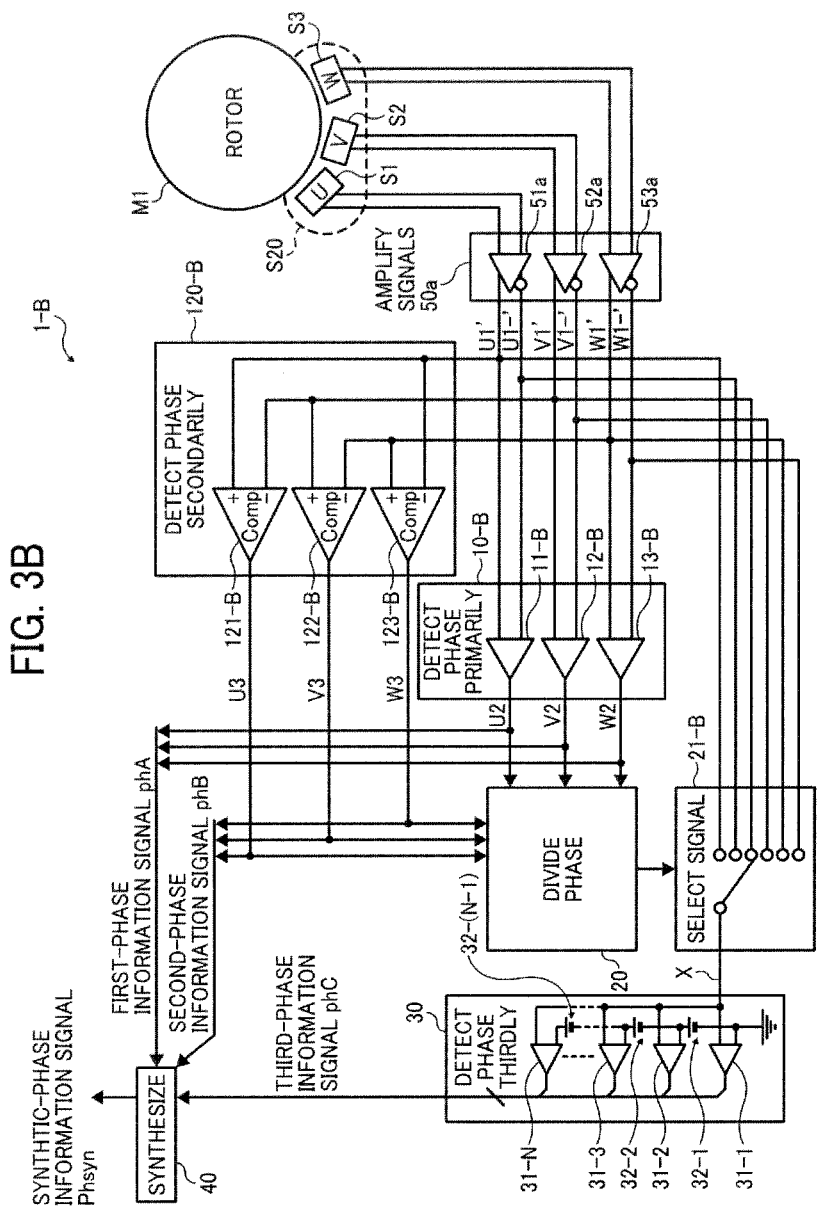
FIG. 3B is a block diagram illustrating a configuration of a motor drive controller according to a variation of a second embodiment.

FIG. 3B is a block diagram illustrating a configuration of a motor drive controller 1-B according to a variation of the second embodiment.

Compared with the motor driver controller 1-A according to the first embodiment, the motor drive controller 1-B according to the variation of the second embodiment includes a signal amplification circuit 50a connected to output terminals of the sensors S1, S2, and S3. The signal amplification circuit 50a (serving as signal amplifier) includes three amplifiers 51a, 52a, and 53a whose input signal and output signal are differential signals.

That is, the differential sensor signals (U1, U1−; V1, V1−; W1, W1−) from the sensors S1, S2, and S3 (U-phase, V-phase, and W-phase) are amplified in the signal amplification circuit 50a. The signal amplification circuit 50a outputs amplified differential sensor signals (U1', U1−', V1', V1−', W1', W1–') to a first phase-information detection circuit 10-B, a second phase-information detection circuit 120-B, and a signal selection circuit 21-B.

The operation and the effect of the second embodiment and the variation of the second embodiment, are similar to each other, the configuration with the signal amplification circuit 50a is more convenient in the point that the sensor signals are uniformed.

Herein, the signal amplification circuit 50a includes three differential amplifiers 51, 52, and 53. In the configuration shown in FIG. 3B, the function of the signal amplification circuit 50a is described below.

The common level or the amplitude level of the differential sensor signals from the sensors S1, S2, and S3 (U-phase, V-phase, and W-phase) are often uneven or often very small electrically. As the common level and the amplitude level are even and as the amplitude is greater, an output signal targeting to a predetermined rotational angle from the third phase-information detection circuit 30 shows a value close to the actual rotational angle of the rotor. That is, even when the differential sensor signals (U1', U1–'; V1', V1–'; and W1', –W1–') from the sensors S1, S2, and S3 are not uniform, the signal amplification circuit 50a adjusts the common level, and adjusts and amplifies the amplitude level.

Accordingly, follow describes the operation in the configuration of the variation of the second embodiment shown in FIG. 3B. As described above, the amplified differential sensor signals (U1', U1–'; V1', V1–'; and W1', W1–') are input to the first phase-information detection circuit 10-B, the second phase-information detection circuit 120-B, and the signal selection circuit 21-B. The first phase-information detection circuit 10-B outputs either high level (Hi) comparison result signals (U2, V2, and W2) or low level (Low) comparison result signal (U2, V2, and W2) for output to the phase dividing circuit 20 and the synthesis circuit 40, for example in the condition shown in TABLE 5. TABLE 5 shows levels of comparison result signals U2, V2, and W2 corresponding to comparison of the input signals (U1, V1, and W1) relative to the paired input signals (U1, V1–, and W1–) input to the first phase-information detection circuit 10-B shown in FIG. 3B.

TABLE 5

| PHASE INFORMATION SIGNAL | HIGH | LOW |
| --- | --- | --- |
| U2 | U1 ≥ U1– | U1 < U1– |
| V2 | V1 ≥ V1– | V1 < V1– |
| W2 | W1 ≥ W1 | W1 < W1– |

Herein, the first phase information signal phA is made based on the comparison result signals U2, V2, and W2 from the first phase-information detection circuit 10-B.

The second phase-information detection circuit 120-B outputs the comparison result signals (U3, V3, and W3) for two-phase, in accordance with the comparison result in response to the input amplified sensor signals (U1, V1, and W1) shown in TABLE 2.

Herein, the second phase information signal phB, having respective phases, is made based on the comparison result signals U3, V3, and W3 from the second phase-information detection circuit 120-B.

In addition, the phase dividing circuit 20-B receives the comparison result signals U2, V2, and W2 from the first phase-information detection circuit 10-B, in addition to the comparison result signals U3, V3, and W3 from the second phase-information detection circuit 120-B. The phase dividing circuit 20 generates the signal-selection signal D, divided into intervals having predetermined phase-intervals based on the comparison result signals U2, V2, and W2; and U3, V3, and W3, for output to the signal selection circuit 21-B.

The signal selection circuit 21-B selects a suitable one of the amplified differential sensor signals (U1', U1–'; V1', V1–'; and W1', W1–'), based on the signal-selection signal D from the phase dividing circuit 20-B, as the selection signal X.

Next, the selection signal X from the signal selection circuit 21-B is input to the third phase-information detection circuit 30. The third phase-information detection circuit outputs multiple phase detection signals indicating that the selection signal X reaches a predetermined threshold level and the motor M1 is rotated at the predetermined angle as a third phase information signal PhC for output to the synthesis circuit 40.

Then, the synthesis circuit 40 synthesizes the first phase information signal phA, the second phase information signal phB, and the third phase information signal phC to generate the synthesis phase information signal Phsyn that contains much information than the first phase-information signal phA, as a motor drive control signal.

Herein, each of the predetermined threshold level indicates the level corresponding to amplitude of the sensor signals (U1', U1–'; V1', V1–'; and W1', W1–') from the rotational angle detector S1, S2, and S3 (threshold level corresponding to a predetermined phase of the rotor), which are set in advance.

Figure 4:
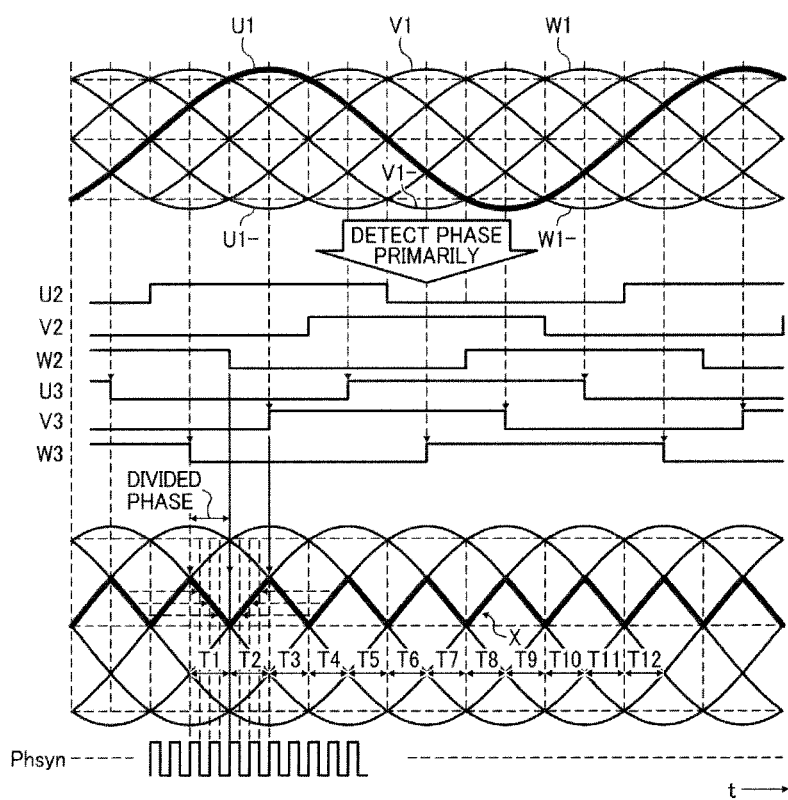
FIG. 4 is a timing chart illustrating operation of signals in the motor drive controllers shown in FIGS. 3A and 3B.

FIG. 4 is a timing chart illustrating operation of the respective signals of the motor drive controllers 1-A (1-B) shown FIGS. 3A and 3B.

The sensors S1, S2, and S3 are arranged at 120° intervals. The differential sensor signals (U1, U1–; V1, V1–; W1, W1–) output from the sensors St, S2, and S3 are sine waves, and the phases of the sine waves in accordance with the magnetic flux of the rotor are deviated at 120° from each other.

Herein, the first phase-information detection circuit 10-B compares the sensor signal U1(U1') and the sensor signal U1–(U1–') to obtain the comparison result signal U2, compares the sensor signal V1 (V1') and the sensor signal V1– (V–') to obtain the comparison result signal U2, and compares the sensor signal W1(W') and the sensor signal W1–(W–') to obtain the comparison result signal W2.

The second phase-information detection circuit 120-B compares the strength of the sensor signals U1, V1, and W1 as illustrated in TABLE 2 to obtain the comparison result signals U3, V3, and W3, that is, a respective one of the sensor signals (e.g., U1) is compared with another of the sensor signals (V1 or W1) from the different sensors (S2, S3). Alternatively, the second phase-information detection circuit 120-B may compare amplitudes of the sensor signals U1–, V1–, and W1– as illustrated in TABLE 2 to obtain the comparison result signals U3, V3, and W3.

Herein, the second phase-information detection circuit 120 divides phases at switching edges among the comparison result signals U2, V2, and W2, and the comparison result signals U3, V3, and W3, and the edge intervals thereof, then, in the predetermined phase intervals, for example, in FIG. 4, the second phase-information detection circuit 120-B selectively switches the selection signal X in accordance with comparison result shown in TABLE 6.

TABLE 6

| PERIOD | CONDITION OF INPUT SIGNALS | SELECTION SIGNAL X | SIGNAL PHASE (ANGLE) |
|---|---|---|---|
| T1  | U3 = V3 = W3 = Low & W2 = Hi      | W1  | 150-180 |
| T2  | U3 = V3 = W3 = Low & W2 = Low     | W1- | 0-30    |
| T3  | U3 = W3 = Low & V3 = Hi, V2 = Low | V1- | 150-180 |
| T4  | U3 = W3 = Low & V3 = Hi, V2 = Hi  | V1  | 0-30    |
| T5  | U3 = V3 = Hi & W3 = Low, U2 = Hi  | U1  | 150-180 |
| T6  | U3 = V3 = Hi & W3 = Low, U2 = Low | U1- | 0-30    |
| T7  | U2 = V3 = W3 = Hi & W2 = Low      | W1- | 150-180 |
| T8  | U2 = V3 = W3 = Hi & W2 = Hi       | W1  | 0-30    |
| T9  | U3 = W3 = Hi & V3 = Low, V2 = Hi  | V1  | 150-180 |
| T10 | U3 = W3 = Hi & V3 = Low, V2 = Low | V1- | 0-30    |
| T11 | U3 = V3 = Low & W3 = Hi, U2 = Low | U1- | 150-180 |
| T12 | U3 = V3 = Low & W3 = Hi, U2 = Hi  | U1  | 0-30    |

Accordingly, a continuous selection signal X can be obtained for the divided phase at the boundaries of intervals divided at electrical angles of 30°.

The sine wave has high linearity at intervals from 150°-180°, 0°-30°, which is a range that is effective for detecting the phase level in the third phase-information detection circuit 30.

Figure 5B:
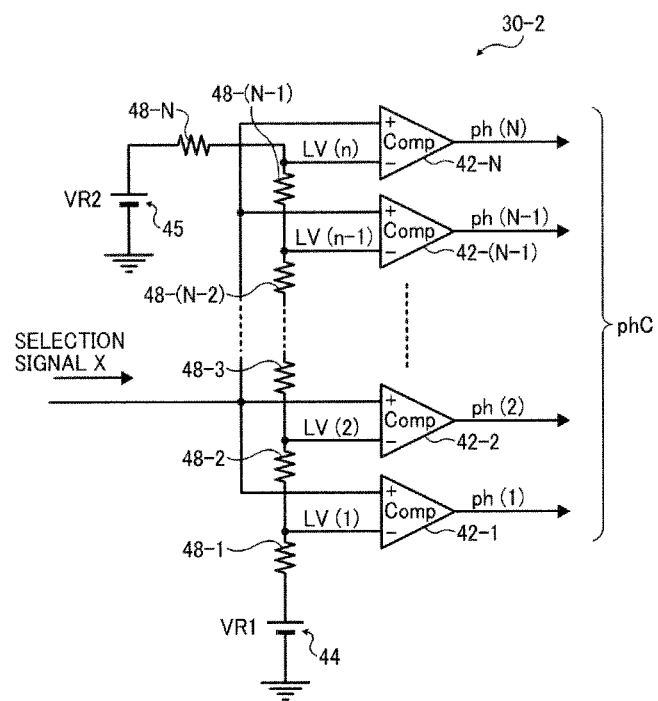
FIG. 5B is a circuit diagram illustrating a second configuration of the third phase-information detection circuit shown in FIGS. 3A and 3B according to the second embodiment.

FIG. 5B is a circuit diagram illustrating a second configuration 30-2 of the third phase-information detection circuit 30 shown in FIGS. 1, 3A, and 3B.

The third phase-information detection circuit 30-2 eliminates the circuit lower than the voltage source 44 and the comparator 42-1, compared to the third phase-information detection circuit 30-1 shown in FIG. 3A In the configuration of FIG. 3B, even when the number of predetermined threshold values in the third phase-information detection circuit 30-2 becomes to half, the third phase-information detection circuit 30-2 shown in FIG. 3B can achieve effects similar to those of the third phase-information detection circuit 30-1, and furthermore, the size of the circuit can be more compact.

Next, one example of the synthesis circuit 40 is described below. The synthesis circuit 40 synthesizes the third phase-information detection circuit phC from the third phase-information detection circuit 30, and the second phase-information signal phB from the second phase-information detection circuit 120-B, and the first phase-information signal phA from the first phase-information detection circuit 10-B to generate the synthesis phase information signal Phsyn that is a digital signal for two-phases.

Figure 6:
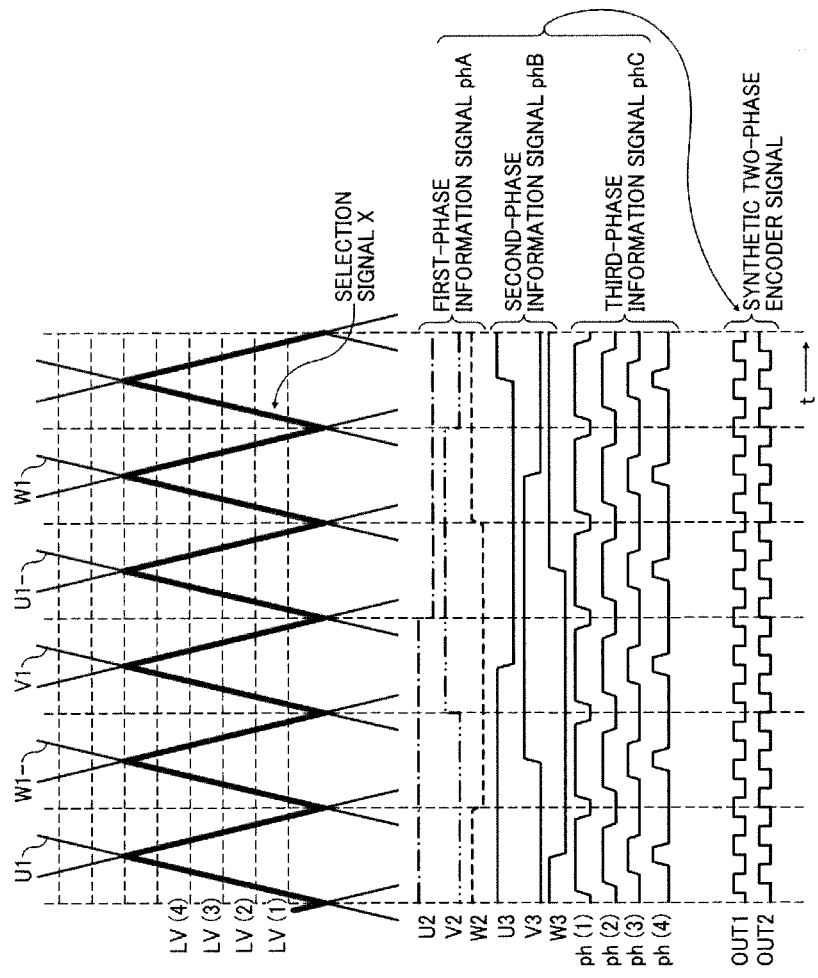
FIG. 6 is a timing chart illustrating operation of signals in the third phase-information detection circuit shown in FIGS. 5A and 5B.

FIG. 6 is a timing chart illustrating operation of signals in the third phase-information detection circuit 30 shown in FIGS. 3A and 3B. FIG. 6 illustrate the selection signal X and the phase information signal ph(1) through ph(4) shown in FIG. 4. In FIG. 6, the third phase-information detection circuit 30 sets the phase information signals ph(1) through ph(4) as the third phase information signal phC so that the electrical angle of 30° is divided into 5 equal parts.

The synthesis circuit 40 outputs two-types of output digital signals OUT1 and OUT2. Herein, the output digital signal OUT1 is constituted by synthesizing based on rising edges of the phase information signals ph(1) and ph(3), and the comparison result signals U3, V3, and W3. The output digital signal OUT2 is constituted by synthesizing based on rising edges of the phase information signals ph(2) and ph(4), and the comparison signals U2, V2, and W2.

Accordingly, without providing optical encoder, an encoder signal (third phase-information signal) having quarter phase difference of cycle can be easily obtained.

(Third Embodiment)

Figure 7:
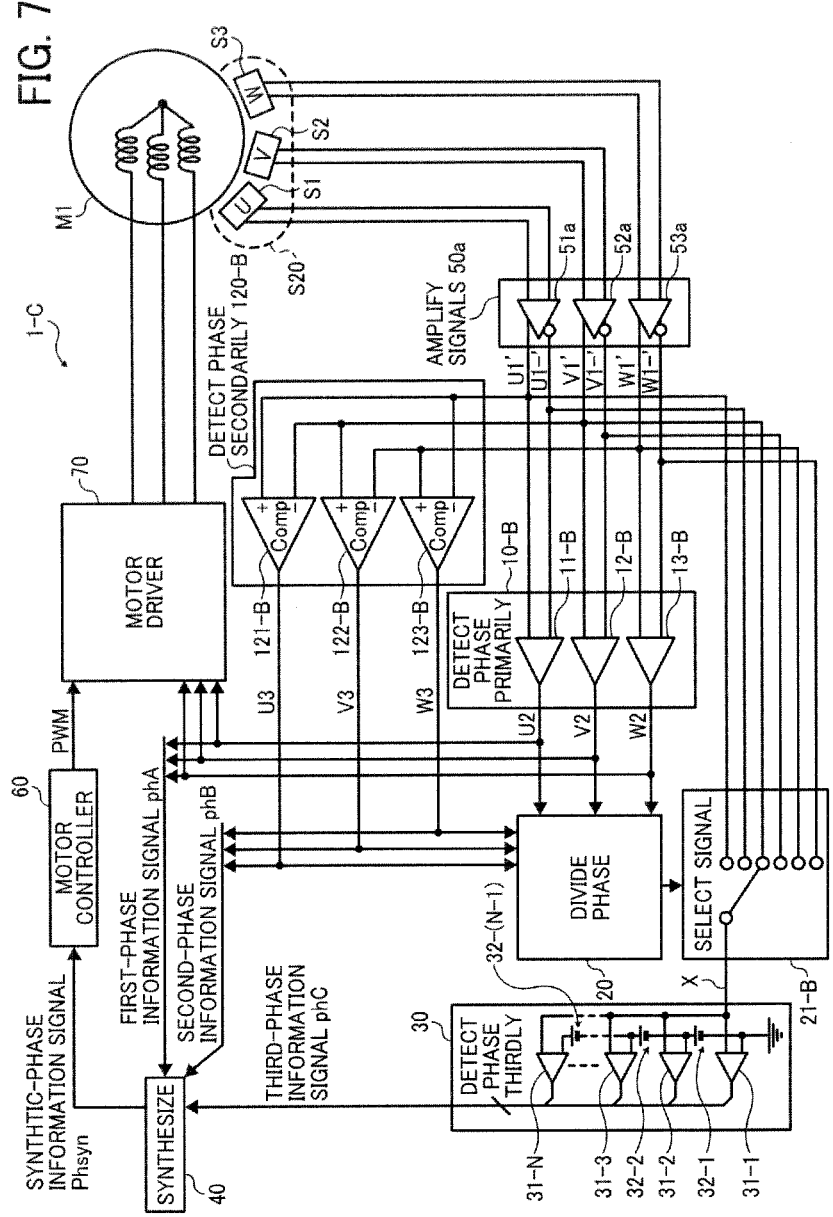
FIG. 7 is a block diagram illustrating a configuration of a motor drive controller according to a third embodiment.

FIG. 7 is a block diagram illustrating a configuration of a motor drive controller 1-C according to a third embodiment.

Compared with the motor drive controller 1-B according to the variation of the second embodiment, the motor drive controller 1-C according to the third embodiment includes a motor driver 70 to selectively send driving currents to multiple motor coils to drive rotating the rotary of the motor M1; and a motor controller 60 to generate pulse width modulation (PWM) signal based on the second phase information signal phB and output the PWM signal to the motor driver 70. The other configuration is similar to the first embodiment, and the description thereof is omitted.

Figure 8:
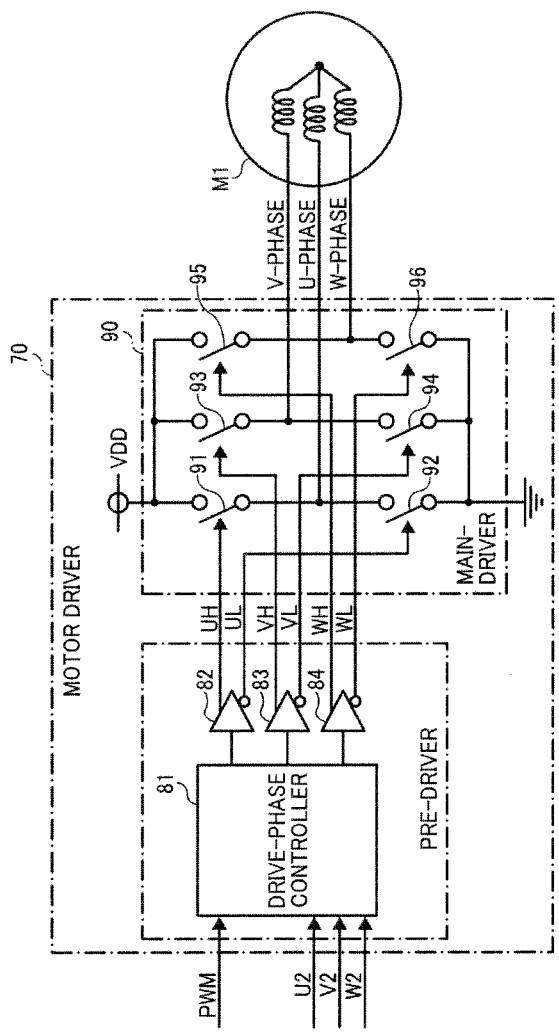
FIG. 8 is a circuit diagram illustrating a configuration of a motor driver shown in FIG. 6.

FIG. 8 is a circuit diagram illustrating a configuration of the motor driver 70 shown in FIG. 7. In FIG. 8, the motor driver 70 includes a pre-driver 80 and a main-driver 90. For example, three-phase coils (U-Phase, V-Phase, and W-Phase) to drive the motor M1 that is a brushless DC motor, are provided inside the motor M1, and the respective three coils are connected in Y-junction inside the motor M1.

Herein, the main driver 90 includes high-side switching elements 91, 93, and 95 connected to a power supply side of the corresponding other side of the coils and low-side switching elements 92, 94, and 96 connected to ground.

The main driver 90 receives switch-control signals (control signals) UH, UL, VH, VL, WH, and WL to drive the respective switching elements 91 through 96, output from the pre-driver 80. The pre-driver 80 is provided in a previous stage of the main driver 90. The pre-driver 80 includes a driving-phase controller 81 and three drive amplifiers 82, 83, and 84.

The switch control signals UH, VH, and WH are coupled to the switch-control signal UL, VL, and WL. The driving-phase controller 81 classifies the phases into a synchronous-rectification phase to operate synchronous rectification in PWM duty cycle, a low-side phase to turn on in only low-side, and a high-side phase to turn off in both high-side and low-side. The driving-phase controller 81 drives the synchronous-rectification phase in accordance with the PWM signal whose duty cycle is determined by the motor controller 60.

Herein, the motor M1 is driven and rotated by determining signal logic of the phase information signals (sensing signals) U2, V2, and W2 generated based on the sensor signals from the magnetic sensors (commutation-current switching sensors) S1 through S3 to obtain the position information disposed adjacent to the rotor of the motor M1, to sort the operation states of the phases into a PWM synchronous-rectification state, a low-side on state, and a both sides off state.

That is, the motor driver 70 selectively sends a current of the control signals (UH, UL, VH, VL, WH, and WL) to one of the coils in the motor M1 to drive the motor M1 in response to the PWM signal generated by the motor controller 60. The phase information signals U2, V2, and W2 determine which control signal is selected from the multi-phase (U-phase, V-phase, or W-phase) coils. The motor driver 70 (pre-driver 80) sort outs (separates) the phase in synchrony with the PWM signal from the other phases based on the sensor signals (phase information signals) U2, V2, and W2 from the commutation-current switching sensors S1 through S3, to selectively send the current to the coil having the synchronized phase.

Figure 9:
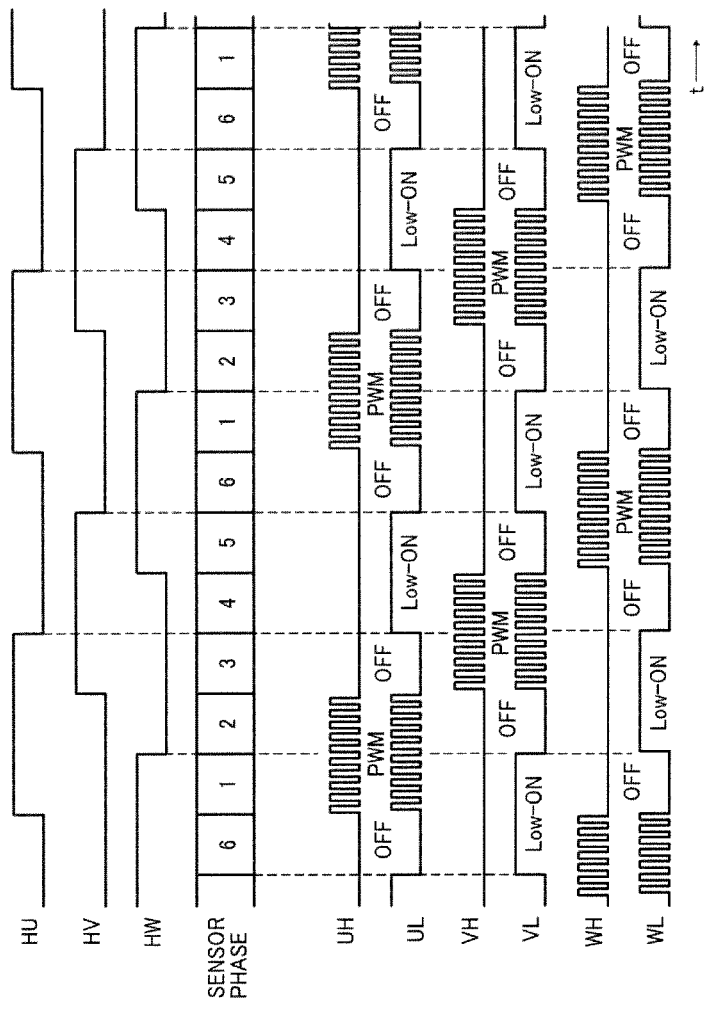
FIG. 9 is a timing chart illustrating respective signals of the operation of the motor driver shown in FIG. 7.

FIG. 9 is a timing chart illustrating respective signals of the operation of the motor driver 70 shown in FIG. 8. FIG. 9 illustrates examples of switching in respective states in the signal logic, which is general driving way to drive the brushless motor M1.

The motor controller 60 appropriately controls the duty-cycle of the PWM signal, based on the phase and the position information of the rotating motor M1 as accurate as possible.

It is to be noted that, without providing the motor controller 60 and inputting the PWM signal from providing the motor controller 60, by inputting a drive control voltage to the motor driver 70, the motor driver 70 may compare the input drive control voltage with a triangular wave having a constant frame cycle to generate a PWM signal.

In FIG. 7, a feature of the motor drive controller 1-C is that, the sensor signals from the commutation-current switching sensors (input to the motor driver 70 for driving the brushless motor M1) are used in common with the multiple sensor signals generated by the multiple rotational-angle detectors (sensors S1 through S3) used in the first and the second embodiments. In addition, the first phase-information detection circuit 10-B as described in the first and second embodiments can be used in the motor driver controller 1-C according to the present configuration device for switching the coils of the motor M1 to which the commutation current is sent. More specifically, the motor driver 70 determines which phase of the rotor of the motor M1 is driven among U-phase, V-Phase, and W-phase based on the signals U2, V2, and W2 from the commutation-current switching sensors S1, S2, and S3 via the first phase-information detection circuit 10-B and the signal amplification circuit 50.

That is, since the signals from the present rotational angle detectors S1, S2, and S3 are used as the signals from the commutation-current switching sensors, the motor driver controller 1-C can acquire multiple types of the phase information without adding the additional sensors.

(Fourth Embodiment)

Figure 10:
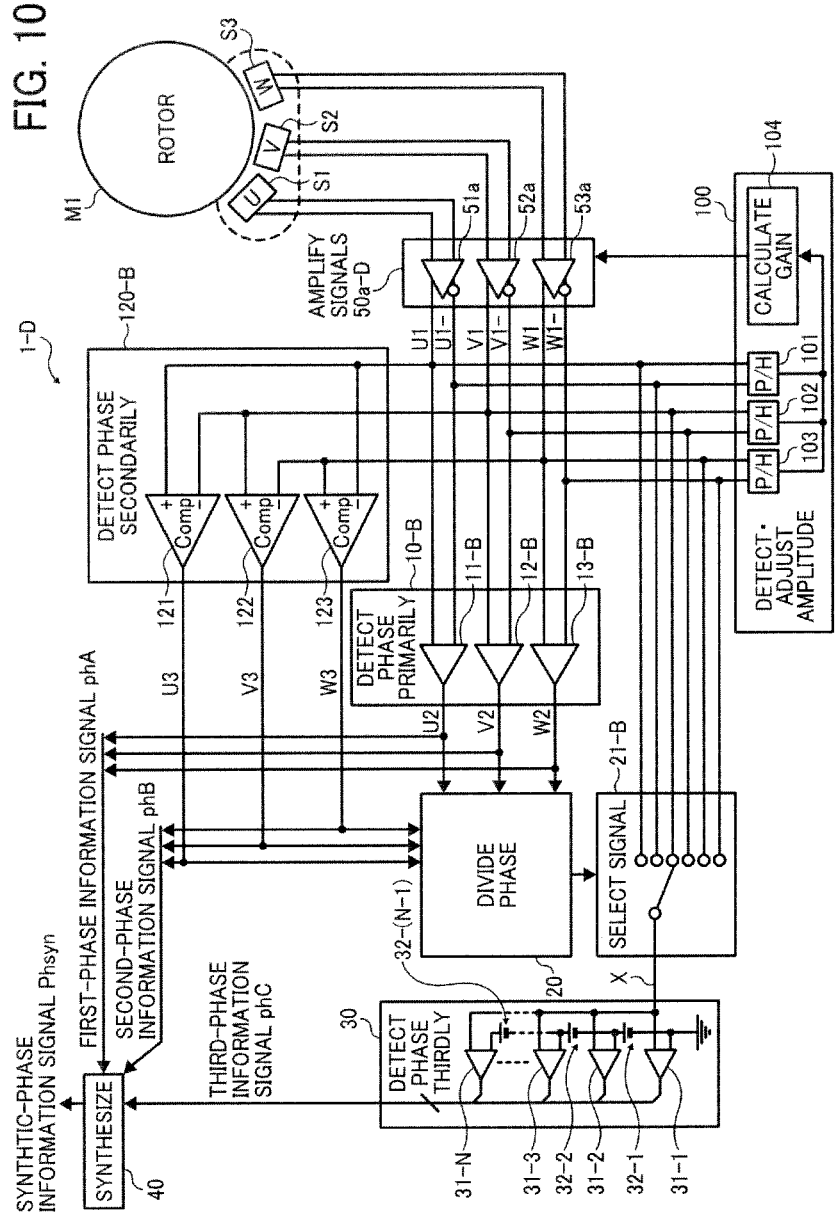
FIG. 10 is a block diagram illustrating a configuration of a motor drive controller according to a fourth embodiment.

FIG. 10 is a block diagram illustrating a configuration of a motor drive controller 1-D according to a fourth embodiment.

Compared to the motor drive controller 1-B of the variation of the second embodiment shown in FIG. 3B, the motor drive controller 1-D of the fourth embodiment includes an amplitude detection-control circuit 100. Other configuration is similar to that of the second embodiment; therefore, description thereof is omitted.

The amplitude detection-control circuit 100 includes, for example, sample-hold (peak-hold) circuits (amplitude detector) 101, 102, and 103 corresponding to the sensors S1, S2, and S3, and a gain calculation circuit (amplitude adjuster) 104. The amplitude detection-control circuit 100 calculates the gain of the amplified sensor signals (U1', U1–'; V1', V1–'; W1', W1–') so that the detected amplitudes are set to predetermined amplitude and feeds the gain back to a signal amplification circuit 50*a*-D.

As described above, as the respective sensor signals often have uneven common levels and amplitude levels, the motor drive controller 1-D of the present disclosure can includes an adjusting device to adjust the common levels and the amplitude levels. An adjusting example is described below.

In the amplitude detection-control circuit 100, the peak-hold circuits (amplitude detectors) 101 through 103 detect peak values of the amplitude of the respective sensor signals (amplified sensor signals U1', U1–'; V1', V1–'; and W1', W1–'), or hold the amplitude at a predetermined electrical angle (e.g., sensor cross point) and estimate the peak-level using level converter to convert the value into the peak value. Then, the gain calculation circuit 104 calculates the gain so that the detected peak level or the estimated peak level is set to the predetermined amplitude level.

Then, the gain calculation circuit 104 feeds back the detected peak level or the estimated peak level to the signal amplifier circuit 50*a*-D, using an up-down counter, and adjusts the amplitude level which enables the respective sensors S1 through S3 to output the appropriate amplitude level. Accordingly, the phase information close to the actual rotary angle of the rotor can be obtained.

(Fifth Embodiment)

Figure 11:
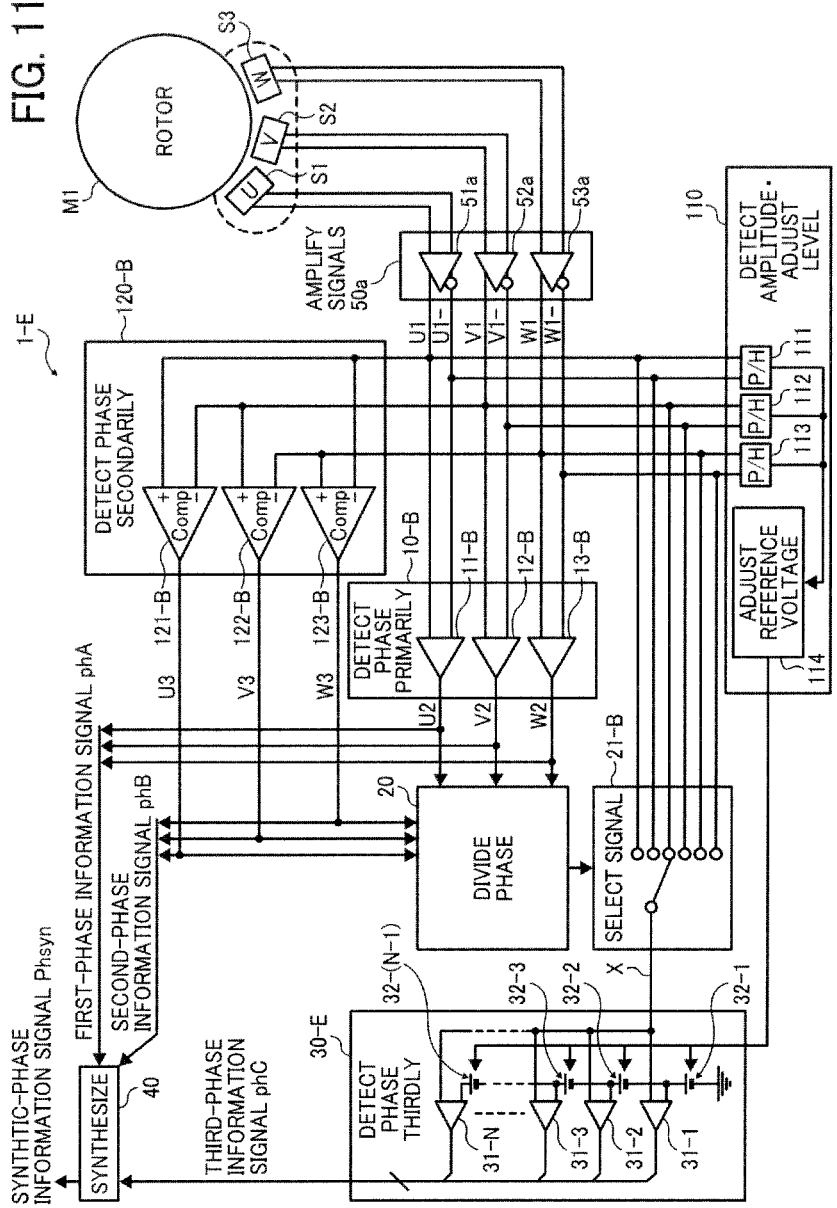
FIG. 11 is a block diagram illustrating a configuration of a motor drive controller according to a fifth embodiment.

FIG. 11 is a block diagram illustrating a configuration of a motor drive controller 1-E according to a fifth embodiment.

Compared to the motor drive controller 1-B of the variation of the second embodiment, the motor drive controller 1-E of the fifth embodiment includes an amplitude-detection level-adjustment circuit 110 to output an signal to a third phase-information detection circuit 30-E, and the third phase-detection circuit 30-E adjusts the reference threshold levels of the voltage source 32-1 through 32-(N−1) corresponding to signal level (result signal) of the signal detected by the amplitude-detection level-adjustment circuit 110. The other configuration of the fifth embodiment is similar to that of the variation of the second embodiment; and therefore, the description thereof is omitted.

The amplitude-detection level-adjustment circuit 110 includes sample-hold (peak holder) circuits (amplitude detectors) 111, 112, and 113, and a reference voltage adjusting circuit (threshold-level adjuster) 114.

Herein, the operation that the different amplitude levels of the respective sensors S1, S2 and S3 are changed to respective reference levels per selection signal X input to the third phase-information detection circuit 30-E is equal to the operation that the corresponding sensor amplitude levels are adjusted. In the present embodiment, the phase information close to the actual rotational angle can be acquired.

Herein, although the amplitude-detection level-adjustment circuit 110 detects the respective amplified sensor signals (U1', U1–'; V1', V1–'; W1', W1–') from the signal amplifier circuit 50*a* in this embodiment, the amplitude-detection level-adjustment circuit 110 may directly detect the respective sensor signals (U1, U1–; V1, V1–; W1, W1–) from the sensors S1, S2, and S3.

Figure 12:
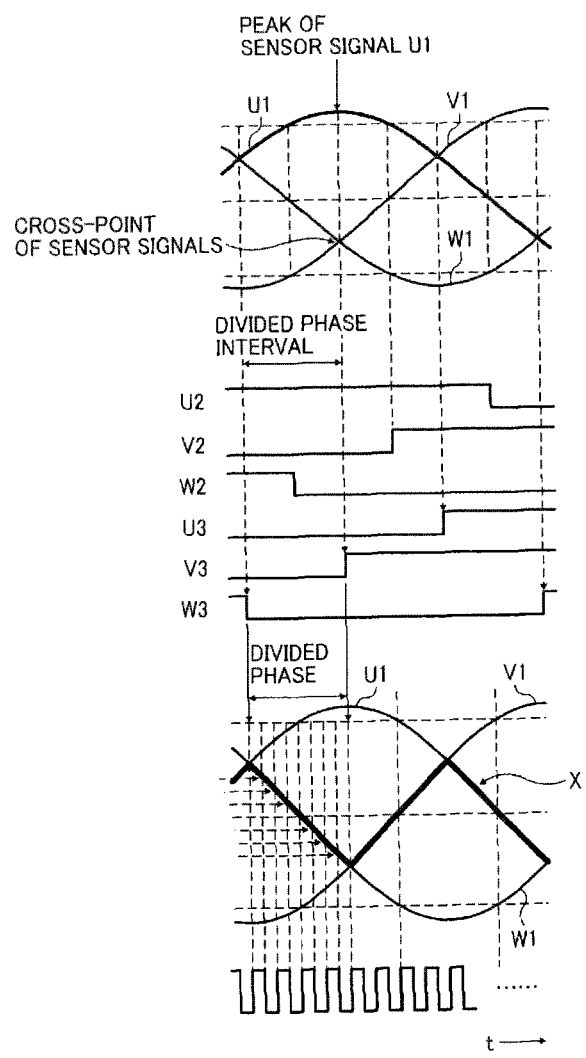
FIG. 12 is a timing chart illustrating respective signals of the operation in divided phase intervals in the motor driver controller shown in FIG. 11.

FIG. 12 is a timing chart illustrating the operation in the divided phase intervals in the motor driver controller 1-E shown in FIG. 11. With reference to FIG. 12, one example of the amplitude level timing shown in the embodiments 4 and 5 is described below.

In the divided phase intervals shown in FIG. 12, the state is under the state (?) that the phase of the sensor signal W1 is detected in the third phase-information detection circuit as the selection signal X.

The respective sensor signals U1, V1, and W1 have phase differences of 120°, and the sensor signal U1 reaches an amplitude peak of sine wave ideally at a cross point of the sensor signals V1 and W1, therefore, by sampling signal levels of the sensor signals U1 at the cross points amplitude of the sensor signals U1 is detected. Similarly to the sensor signal U1, the amplitudes of the sensor signals V1 and W1 are detected.

Herein, as the selection signal X is switched from the sensor signal W1 to the sensor signal U1 at the divided phase switching point, signal amplitude of the sensor signal U1 is detected and calculated, and then gain of the sensor signal U1 in the signal amplification circuit 51*a* is immediately adjusted. Therefore, no error and malfunction occur in the phase-information detection circuits 10-B, 120-B, and 30-B.

Therefore, while the phase of one sensor signal is detected in the respective divided phase intervals, amplitude of another sensor signal (whose phase is not detected the phase) can be detected at the same time, and accordingly, which always capable the signals to be corrected in real time.

(Sixth Embodiment)

Figure 13:
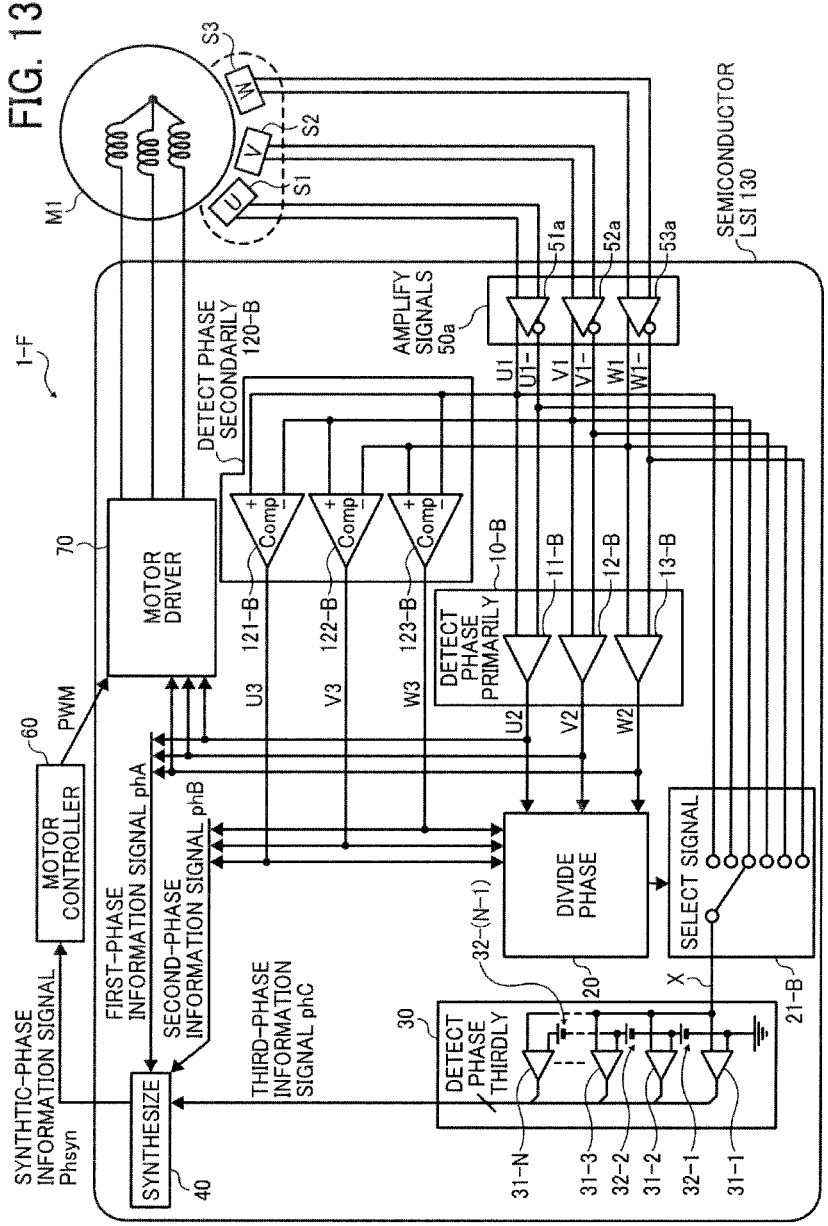
FIG. 13 is a block diagram illustrating a configuration of a motor drive controller according to a sixth embodiment.

FIG. 13 is a block diagram illustrating a configuration of a motor drive controller 1-F according to a sixth embodiment.

As a feature of the sixth embodiment, in the motor drive controller 1-F of the present embodiment, the circuits of the motor drive controller 1-C of the third embodiment shown in FIG. 7, except the motor M1, the sensors S1 through S3, and the motor M1, are integrated as a single unit of a semiconductor integrated circuit (semiconductor LSI) 130.

In general, the motor driver 70 is originally integrated in a semiconductor integrated circuit. In addition, by putting the multi-phase information detection circuits 10, 120, and 30 on the same chip, without increasing the size of the circuit, the circuit can be compact without providing the optical encoder.

As configurations of integrating as the semiconductor LSI (semiconductor device), the configuration is not limited to the device 130 shown in FIG. 13. For example, only the phase information-detection circuits 10, 120 and 30 may be integrated as a single unit, or the motor controller 60 in addition to the circuit shown in FIG. 13 may be integrated. As the motor driver 70 shown in FIG. 8 to drive the drive phase coil works as a heating source, only the motor driver 70 may be separated from the integrated circuit in some case.

Alternatively, the third phase-information detection circuit 30 and the amplitude detection control circuit 100 or the amplitude-detection level adjustment circuit 110 may be integrated as the same integrated circuit.

In FIG. 13, similarly to FIG. 7, the sensor signals from the commutation-current switching sensors (input to the motor driver 70 for driving the brushless motor M1) are used in common with the multiple sensor signals generated by the multiple rotational-angle detectors (sensors S1 through S3) used in the first through fifth embodiments.

As described above, the sensors S1 through S3 are the magnetic sensors to detect the rotor of the motor M1, and Hall elements are generally used as the sensors S1 through S3. It is often the case that a magnetic flux density generated by rotating the rotor is sine wave, and accordingly, the signal from the magnetic sensor is the sine wave.

It is to be noted that, the magnetic flux density received in the fixed magnetic sensor while generating the magnetic flux by rotating the rotor is not always regular sine wave, and sometimes the magnetic flux density may be irregular sine wave. Further, due to the magnetic saturation caused by exceeding the sensed magnetic flux density over an acceptable value of the magnetic sensor, the output of the magnetic sensor may be saturated and wave of the output may become a trapezoid wave.

However, in a cycle of electrical angle of −60° to 60°, if the magnetic flux density is sine wave or similar sine wave, the circuit of the present disclosure can detect accurate multi-phases.

As described above, in the motor drive controller of the present disclosure can detect accurate phases of the rotors to some extents based on the multiple magnetic sensors arranged adjacent to the rotor of the motor. For example, by outputting the detected phase information as the phase-position information to the motor controller as the digital signal, driving the motor can be controlled. Furthermore, by integrating the motor drive controller, without using an expensive rotary optical encoder, the motor drive controller that can become small and can include a phase detection device to detect finely smaller than the changing interval of the magnetic sensor can be realized.

Numerous additional modifications and variations are possible in light of the above teachings. It is therefore to be understood that, within the scope of the appended claims, the disclosure of this patent specification may be practiced otherwise than as specifically described herein.

What is claimed is:

1. A motor drive controller to drive and control a motor that has a rotor and multi-phase coils inside the rotor, based on multiple rotational angle detectors that generate multiple differential sensor signals corresponding to different positions of the rotor;

the motor drive controller comprising:
a signal amplifier-converter circuit to amplify and convert the differential sensor signals into single-ended sensor signals;
a first phase detector to compare the multiple single-ended sensor signals with multiple predetermined threshold levels to detect phases of the rotor, and output a first phase information signal representing a first detected phase;
a second phase detector to compare a respective one of the multiple single-ended sensor signals with another of the single-ended sensor signals from the different rotational detector via the signal amplifier-converter circuit to detect the phases of the rotor, and output a second phase information signal representing a second detected phase;
a phase divider to divide the phases, detected by the second phase detector, into multiple predetermined phase intervals;
a signal selector to select one of the respective multiple single-ended sensor signals from the signal amplifier-converter circuit in the multiple predetermined phase interval; and
a third phase detector to detect whether the signal selected by the signal selector reaches a predetermined threshold level corresponding to a predetermined phase of the rotor, and output a third phase information signal representing a third detected phase different from the first detected phase and the second detected phase.

2. The motor drive controller according to claim 1, further comprising:
a synthesizer to synthesize the first phase information signal, the second phase information signal, and the third phase information signal to generate a digital signal for at least one phase,
wherein the digital signal is used for driving the motor.

3. The motor drive controller according to claim 2, further comprising:
a motor controller to receive the digital signal from the synthesizer to generate a PWM signal based on the digital signal; and
a motor driver to generate control signals and selectively send a current of the control signal to one of the coils in the motor to drive the motor in response to the PWM signal generated by the motor controller,
wherein the motor drive controller is connected to commutation-current switching sensors to generate a sensing signal to determine which one of the control signals is selected for the multi-phase coil,
wherein the motor driver separates one phase in synchrony with the PWM signal from the other phases of the control signals based on the sensing signals from the commutation-current switching sensors, to selectively send the current to the coil having the synchronized phase, and
wherein the sensing signals from the commutation-current switching sensors are used in common with the multiple sensor signals generated by the multiple rotational-angle detectors.

4. The motor drive controller according to claim 1, further comprising:
- an amplitude detector to detect peak levels of the respective single-ended sensor signals to output a result signal; and
- a threshold level adjuster to generate an adjusting signal for output to the third phase detector to adjust the predetermined threshold level,
- wherein the third phase detector detects whether the signal selected by the signal selector reaches the predetermined threshold level adjusted by the threshold level adjuster, corresponding to the predetermined phase of the rotor, and outputs the third phase information signal representing the third detected phases.

5. The motor driver controller according to claim 4, wherein, while the third phase detection circuit detects the phase of one single-ended sensor signal in the respective phase interval divided by the phase divider, the amplitude detectors detects the amplitude of another single-ended sensor signal that is not detected in the third phase detection circuit.

6. The motor drive controller according to claim 1, wherein the sensor signal selected in the signal selector is a continuous signal, and the phase divider divides the phase of the second phase information signal into intervals corresponding to electrical angles of 60° of the motor.

7. The motor drive controller according to claim 1, wherein the sensor signal selected in the signal selector is a continuous signal, and the phase divider divides the phase of the second phase information signal into intervals corresponding to electrical angles of 30° of the motor.

8. The motor drive controller according to claim 1, wherein the sensor signal is a sine wave.

9. The motor drive controller according to claim 1, wherein the signal amplifier and the multiple rotational angle detectors comprise a single unit.

10. A motor drive controller to drive and control a motor that has a rotor and multi-phase coils inside the rotor, based on multiple rotational angle detectors to generate multiple differential sensor signals corresponding to different positions of the rotor,
the motor drive controller comprising:
- a first phase detector to compare a respective one of the multiple sensor signals with a paired sensor signal from the same rotational angle detector to detect phases of the rotor, and output a first phase information signal representing first detected phase;
- a second phase detector to compare a respective one of the sensor signals with another sensor signal from the different rotational angle detector to detect the phases and output a second phase information signal representing a second detected phase;
- a phase divider to divide the phases, detected by the first phase detector and the second phase detector, into multiple predetermined phase intervals;
- a signal selector to select one of the respective multiple sensor signals from the rotational angle detectors, in the multiple predetermined phase interval; and
- a third phase detector to detect whether the signal selected by the signal selector reaches a predetermined threshold level corresponding to a predetermined phase of the rotor, and output a third phase information signal representing a third detected phase different from the first detected phase and the second detected phase.

11. The motor drive controller according to claim 10, further comprising:
- a signal amplifier to adjust and amplify amplitudes of the multiple sensors,
- wherein the first phase detector compares a respective one of the multiple amplified sensor signals with a paired amplified sensor signal from the same rotational angle detector via the signal amplifier to detect phases of the rotor, and outputs the first phase information signal representing the first detected phase,
- wherein the second phase detector compares a respective one of the amplified sensor signal with another amplified sensor signals from the different rotational angle detector via the signal amplifier to detect the phases and outputs the second phase information signal representing the second detected phase, and
- wherein the signal selector to select one of the respective multiple amplified sensor signals from the signal amplifier, in the multiple predetermined phase interval.

12. The motor drive controller according to claim 10, further comprising:
- a synthesizer to synthesize the first phase information signal, the second phase information signal, and the third phase information signal to generate a digital signal for at least one phase,
- wherein the digital signal is used for driving the motor.

13. The motor drive controller according to claim 12, further comprising:
- a motor controller to receive the digital signal from the synthesizer to generate a PWM signal based on the digital signal; and
- a motor driver to generate control signals and selectively send a current of the control signal to one of the coils in the motor to drive the motor in response to the PWM signal generated by the motor controller,
- wherein the motor drive controller is connected to commutation-current switching sensors to generate a sensing signal to determine which one of the control signals is selected for the multi-phase coil,
- wherein the motor driver separates one phase in synchrony with the PWM signal from the other phases of the control signals based on the sensing signals from the commutation-current switching sensors, to selectively send the current to the coil having the synchronized phase, and
- wherein the sensing signals from the commutation-current switching sensors are used in common with the multiple sensor signals generated by the multiple rotational-angle detectors.

14. The motor drive controller according to claim 10, further comprising:
- an amplitude detector to detect peak levels of the respective sensor signals to output a result signal; and
- a threshold level adjuster to generate an adjusting signal for output to the second phase detector to adjust the predetermined threshold level,
- wherein the third phase detector detects whether the signal selected by the signal selector reaches the predetermined threshold level adjusted by the threshold level adjuster, corresponding to the predetermined phase of the rotor, and outputs the third phase information signal representing the third detected phase.

15. The motor driver controller according to claim 14, wherein, while the third phase detection circuit detects the phase of one sensor signal in the respective phase interval divided by the phase divider, the amplitude detector detects the amplitude of another sensor signal that is not detected in the third phase detection circuit.

16. The motor drive controller according to claim 11, further comprising
- an amplitude detector to detect peak levels of the respective amplified sensor signals to output a result signal; and
- an amplitude adjuster to calculate a desired amplitude level of the amplified sensor signals in accordance with the result signal from the peak holder and feed back the calculated result to the signal amplifier,
- wherein the signal amplifier adjusts and amplifies amplitudes of the multiple sensor signals based on the calculated result from the amplitude calculator.

17. The motor drive controller according to claim 10, wherein the sensor signal selected in the signal selector is a continuous signal, and the phase divider divides the phase of the first phase information signal and the second phase information signal into intervals corresponding to electrical angles of 30° of the motor.

18. The motor drive controller according to claim 10, wherein the sensor signal selected in the signal selector is a continuous signal, and the phase divider divides the phase of the first phase information signal and the second phase information signal into intervals corresponding to electrical angles of 60° of the motor.

19. The motor drive controller according to claim 10, wherein a waveform of the sensor signal is a sine wave.

20. A control method of driving and controlling a motor that has a rotor and multi-phase coils inside the rotor, based on multiple differential sensor signals, detected by rotational angle detectors, corresponding to different positions of the rotor, the method comprising the steps of:
- comparing a respective one of the multiple sensor signals with a paired sensor signals from the same rotational angle detector to detect phases of the rotor;
- outputting a first phase information signal representing a first detected phase;
- comparing a respective one of the sensor signals with another of the sensor signals from the different rotational angle detector to detect the phases of the rotor;
- outputting a second phase information signal representing a second detected phase;
- dividing the first detected phase and the second detected phase into multiple predetermined phase intervals;
- selecting one of the respective multiple sensor signals from the rotational angle detectors, in the multiple predetermined phase interval; and
- detecting whether the selected signal reaches a predetermined threshold level corresponding to a predetermined phase of the rotor; and
- outputting a third phase information signal representing a third detected phase different from the first detected phase and the second detected phase.

* * * * *